United States Patent
Bhanushali et al.

(10) Patent No.: US 11,112,791 B2
(45) Date of Patent: Sep. 7, 2021

(54) SELECTIVE COMPRESSION OF IMAGE DATA DURING TELEOPERATION OF A VEHICLE

(71) Applicant: Valeo Schalter und Sensoren GmbH, Bietigheim-Bissingen (DE)

(72) Inventors: Jagdish Bhanushali, San Jose, CA (US); Cyril Rastoll, Palo Alto, CA (US); Adithya Ranga, Sunnyvale, CA (US)

(73) Assignee: VALEO SCHALTER UND SENSOREN GMBH

( * ) Notice: Subject to any disclaimer, the term of this patent is extended or adjusted under 35 U.S.C. 154(b) by 183 days.

(21) Appl. No.: 16/402,032

(22) Filed: May 2, 2019

(65) Prior Publication Data

US 2020/0348665 A1 Nov. 5, 2020

(51) Int. Cl.
*G05D 1/00* (2006.01)
*H04N 19/17* (2014.01)

(52) U.S. Cl.
CPC ......... *G05D 1/0038* (2013.01); *G05D 1/0022* (2013.01); *H04N 19/17* (2014.11)

(58) Field of Classification Search
CPC .................................................. G05D 1/0038
See application file for complete search history.

(56) References Cited

U.S. PATENT DOCUMENTS

| 2011/0071703 | A1* | 3/2011 | Schoettl | G05D 1/0038 |
| | | | | 701/2 |
| 2016/0283804 | A1* | 9/2016 | Furman | G06K 9/00805 |
| 2018/0181118 | A1* | 6/2018 | Yoneda | G06K 9/00805 |
| 2020/0043381 | A1* | 2/2020 | Tsukamoto | H01L 51/003 |
| 2020/0327350 | A1* | 10/2020 | Anand | G06K 9/00805 |

* cited by examiner

*Primary Examiner* — Anne Marie Antonucci
*Assistant Examiner* — Abdalla A Khaled
(74) *Attorney, Agent, or Firm* — Weaver Austin Villeneuve & Sampson LLP

(57) ABSTRACT

Techniques are described for compressing image data for transmission to a computer system of a remote operator controlling a vehicle. A visual representation of a surrounding environment is generated from one or more images captured at the vehicle. One or more regions of interest in the visual representation are identified based at least on information received from the computer system of the remote operator, the information indicating a direction or area of focus of the remote operator. Regions of interest can be compressed to a lesser extent than regions located outside the regions of interest. The compressed visual representation is transmitted to the computer system for decompression and, ultimately, display on one or more display devices viewed by the remote operator.

20 Claims, 10 Drawing Sheets

SELECTIVE COMPRESSION OF IMAGE DATA DURING TELEOPERATION OF A VEHICLE

BACKGROUND

Aspects of the disclosure relate to compressing image data for transmission to a computer system of a remote operator controlling a vehicle. Remote operation (also known as teleoperation) involves wireless transmission of driving inputs and can be used in place of manual operation by the driver/owner of the vehicle or in place of automated operation of the vehicle. Because the remote operator is not physically present in the vehicle, teleoperation usually requires transmission of data about the environment around the vehicle in order to assist the remote operator in controlling the vehicle. The transmitted data can include a video stream of live images captured by a camera on-board the vehicle. Generally, the video stream is continuously updated in real time as the vehicle is maneuvered under the control of the remote operator.

Images transmitted to a remote operator should be of sufficient quality (e.g., high resolution) to enable the remote operator to clearly see details that are relevant to driving decisions. Images should also be transmitted with low latency so that the images seen by the remote operator accurately reflect the present surroundings of the vehicle. Continuous transmission of sufficient quality images can involve sending a large quantity of image data over a wireless communication network. The bandwidth for image transmission can be limited based on a number of factors such as the overall transmission capacity of the network and, in situations where bandwidth is shared among multiple users, the total number of users that are accessing the network at any given time. One option for real-time transmission is to compress the images in order to reduce the amount of data transmitted. However, over-compression can result in important details being lost because the resolution of the image after decompression by the receiver is too low for the remote operator to see those details clearly.

BRIEF SUMMARY

Methods, systems, and computer-readable media are disclosed for compressing image data for display to a remote operator of a vehicle. The image data can be selectively compressed to provide better image quality (e.g., higher resolution) for certain portions of images viewed by the remote operator. Portions which are compressed to a lesser extent, and therefore higher quality, correspond to regions of interest that can be identified based on various techniques described herein.

In certain embodiments, a region of interest is identified based on a direction or an area of focus of the remote operator. For instance, a gaze or face direction of the remote operator can be detected using a sensor of a driver monitoring system, and can be mapped to a region of interest. Other techniques for identifying regions of interest, such as based on vehicle trajectory or detection of features in the surrounding environment, are also described.

In certain embodiments, a method for compressing image data for display to a remote operator of a vehicle includes receiving, by a first computer system located on the vehicle, information from a second computer system remotely located from the vehicle, the information indicating a direction or area of focus of the remote operator. The method further includes generating, by the first computer system, a visual representation of a surrounding environment around the vehicle based on at least one image captured by one or more cameras on the vehicle. The first computer system identifies a first region in the visual representation as being a region of interest based on the information from the second computer system. Further, the first computer system compresses the visual representation, wherein the first region is compressed to a lesser extent than a second region located outside the first region in the visual representation. The method further includes transmitting, by the first computer system, the compressed visual representation to the second computer system, wherein the compressed visual representation is decompressed for display on one or more display devices viewed by the remote operator.

In certain embodiments, a vehicle system includes one or more sensors, including one or more cameras configured to capture images of a surrounding environment around the vehicle. The vehicle system further includes one or more processors configured to perform a method for compressing image data for display to a remote operator. In particular, the one or more processors may be configured to generate a visual representation of the surrounding environment based on at least one image captured by the one or more cameras; identify a first region in the visual representation as being a region of interest based on the information from the remote computer system; and compress the visual representation, wherein the first region is compressed to a lesser extent than a second region located outside the first region in the visual representation. Further, in certain embodiments, one or more additional regions of interest may be identified and compressed to a lesser extent than the second region. The additional regions of interest can be identified, for example, based on data from the one or more sensors.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1:
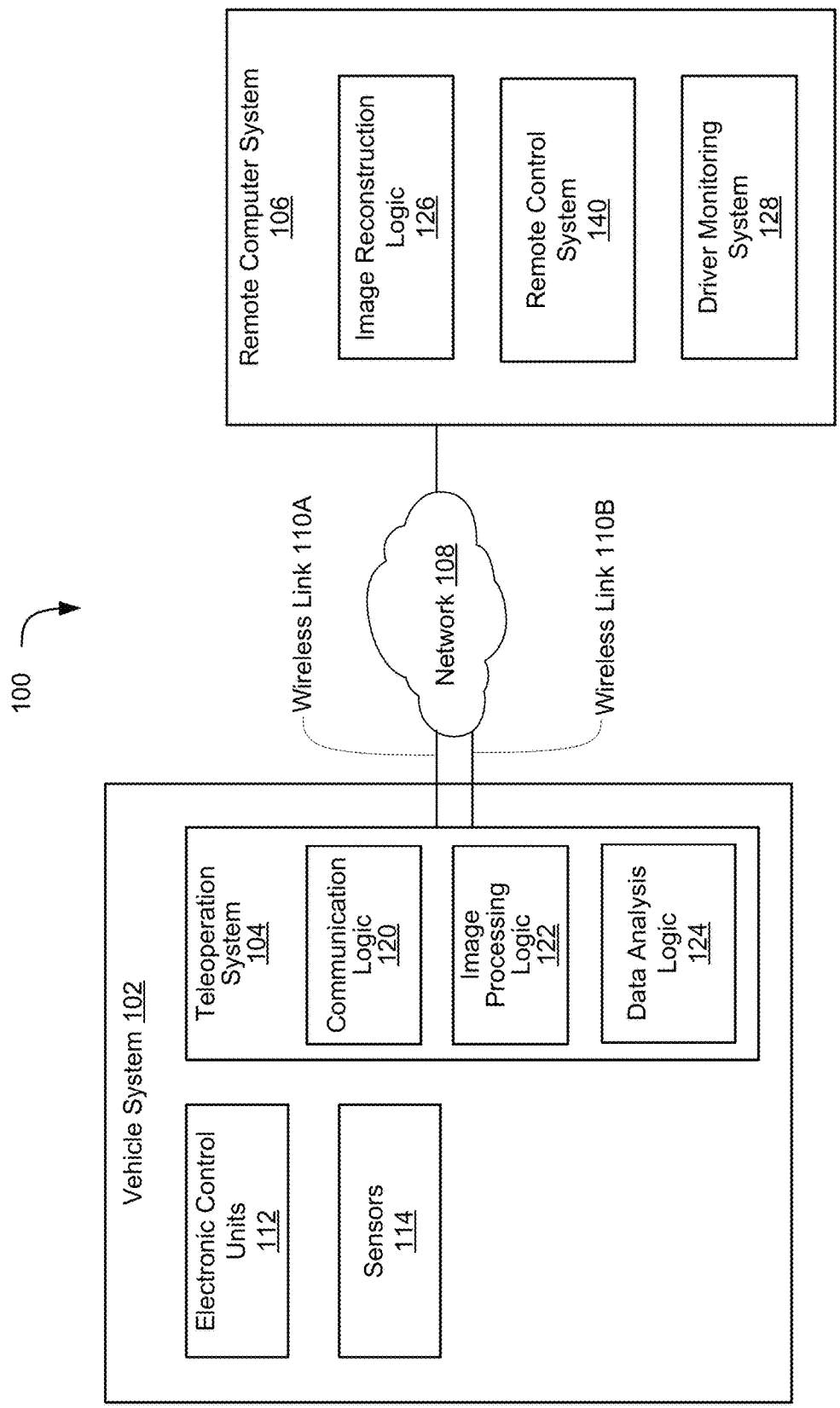
FIG. 1 illustrates an example computing environment in which one or more embodiments can be implemented.

FIG. 1 illustrates an example computing environment 100 in which one or more embodiments can be implemented. The computing environment 100 includes a vehicle system 102 and a remote computer system 106 communicatively coupled by a network 108. In certain embodiments, the vehicle system 102 and the remote computer system 106 may each comprise one or more processors and one or more non-transitory computer-readable storage media storing instructions that are executable by the one or more processors to implement the embodiments described herein.

Vehicle system 102 may comprise any number of components that control various aspects of a vehicle such as a car, truck, boat, plane, etc. In the example of FIG. 1, vehicle system 102 includes a teleoperation system 104, electronic control units (ECUs) 112, and a plurality of sensors 114. The vehicle system 102 is located on the vehicle and is configured to control the vehicle based in part on driving instructions from the remote computer system 106.

Vehicle system 102 comprises a computer system that includes the ECUs 112. ECUs 112 can include any number of embedded systems that each control one or more electrical systems or other subsystems of the vehicle in which vehicle system 102 is located. Examples of ECUs 112 may include, without limitation, an engine control unit, a power steering control unit, a powertrain control module, a speed control unit, a telematics control unit, a transmission control unit, and/or a brake control module. In some embodiments, the ECUs 112 and/or the teleoperation system 104 may comprise one or more processors and one or more non-transitory computer-readable storage media storing processor-executable instructions.

Figure 2:
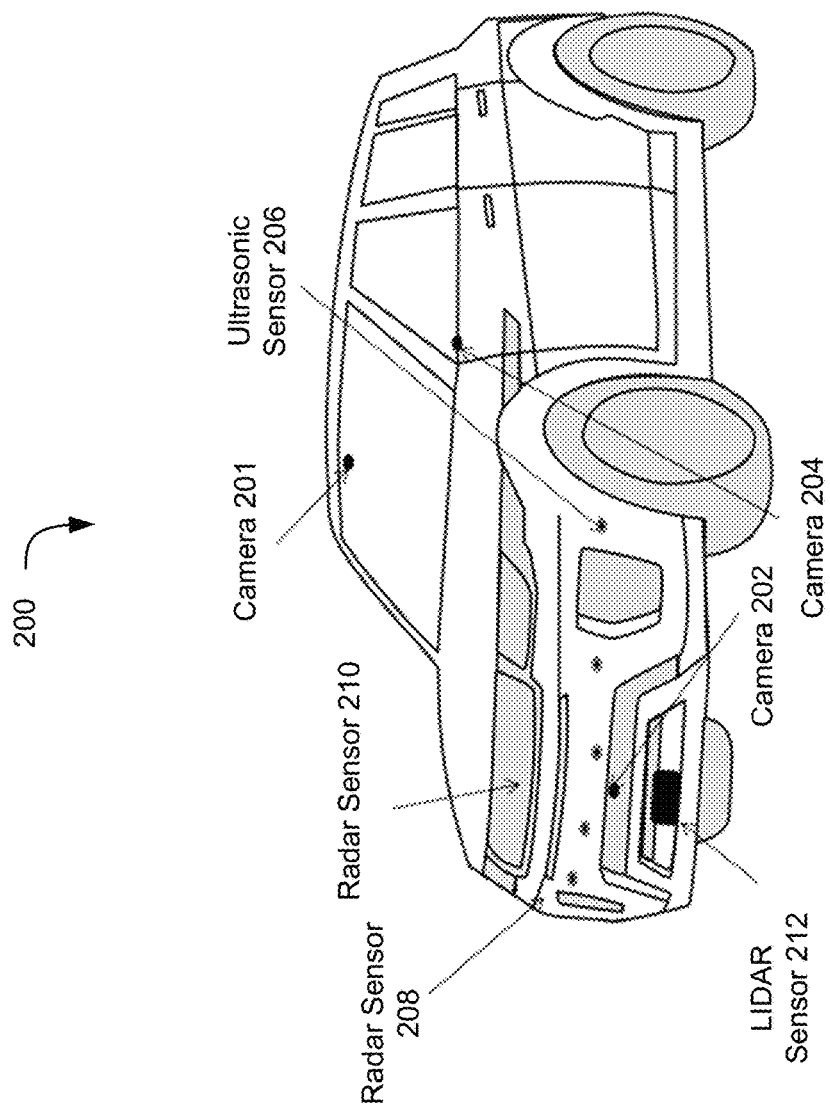
FIG. 2 illustrates an example sensor configuration of a vehicle.

Sensors 114 may comprise any number of devices that capture information about the vehicle and/or information about an environment external to the vehicle. Examples of sensors 114 may include, without limitation, a camera, a microphone, a Radio Detection and Ranging (radar) sensor, an ultrasonic sensor, a Light Detection and Ranging (LIDAR) sensor, a global positioning system (GPS) sensor, a steering angle sensor, and/or a motion sensor (e.g., an accelerometer and/or gyroscope). An example sensor configuration is shown in FIG. 2.

Teleoperation system 104 may comprise one or more computing devices (e.g., hardware processors, microcontrollers, systems on a chip, etc.) that, among other things, facilitate communication between vehicle system 102 and remote computer system 106. In FIG. 1, teleoperation system 104 is depicted as part of vehicle system 102. However, teleoperation system 104 can be implemented as a separate system that is communicatively coupled to vehicle system 102. Thus, teleoperation system 104 may be a standalone computer system. For example, teleoperation system 104 may be an "aftermarket" device specially configured to interface with particular vehicle makes and/or models.

As illustrated in FIG. 1, teleoperation system 104 can include communication logic 120, image processing logic 122, and data analysis logic 124. In certain embodiments, the communication logic 120, image processing logic 122, and data analysis logic 124 are implemented using software instructions stored on computer readable media. Processing described with respect to the various components of the teleoperation system can also be implemented in hardware or a combination of hardware and software including, for example, a graphics processor that implements the image processing logic 122.

Teleoperation system 104 may be communicatively coupled to remote computer system 106 via the network 108. Network 108 can include one or more communication networks. Example communication networks may include, without limitation, the Internet, a wide area network (WAN), a local area network (LAN), a public network, a private network, a wired network, and/or a wireless network. Due to the mobile nature of vehicle system 102, teleoperation system 104 typically connects to network 108 via one or more wireless communication links, such as one or more wireless links 110. Each wireless link 110 may comprise a cellular network connection, a WiFi network connection, a Bluetooth network connection, and/or any other network connection based on a wireless communication protocol.

Each wireless link 110 may support bidirectional communication between the vehicle system 102 and the remote computer system 106. In some embodiments, separate wireless links can be used to communicate data in opposite directions. For example, a first wireless link 110A could be used to transmit one or more video streams from the vehicle system 102 to the remote computer system 106, and a second wireless link 110B could be used to transmit information (e.g., information captured by a driver monitor system 128) from the remote computer system 106 to the vehicle system 102 in parallel with transmission occurring over the first wireless link 110A. In some embodiments, the same data may be communicated over the wireless links 110A-B for redundancy in case one of the wireless links fails. In some embodiments, the data may be split into two sections and sent simultaneously over the wireless links 110A and 110B.

The speed with which data can be transmitted between the remote computer system 106 and the vehicle system 102 (e.g., the transmission speed of a wireless link 110, as measured in terms of latency, bandwidth, and/or throughput) may vary significantly from one moment to another and/or from one location to another. This can be problematic when remotely operating a vehicle, because even a slight delay can lead to a collision as a result being unable to send information to and/or receive information from the remote computer system 106 in a timely manner. Accordingly, teleoperation system 104 may comprise communication logic 120 that establishes and concurrently maintains one or more wireless network connections for communicating with remote computer system 106. For example, wireless link 110A may be a cellular network connection, and wireless link 110B may be a WiFi network connection. In another example, wireless link 110A may use the $5^{th}$ generation of cellular communication systems (5G) while wireless link 110B may use the $4^{th}$ generation of cellular communication systems (4G). Although only two different wireless links are illustrated in FIG. 1, it should be appreciated that teleoperation system 104 may establish and concurrently maintain any number of wireless links.

In some embodiments, communication logic 120 may monitor a transmission speed of each wireless link 110 (e.g., by determining latency, bandwidth, and/or throughput) and enable communication via the wireless link exhibiting the fastest speed (e.g., lowest latency and/or greatest bandwidth) at any particular point in time. For example, if wireless link 110A exhibits lower latency than wireless link 110B at time T1, then teleoperation system 104 may communicate via wireless link 110A and not wireless link 110B. However, if wireless link 110A exhibits higher latency than wireless link 110B at time T2, then teleoperation system 104 may communicate via wireless link 110B and not wireless link 110A. The quantity of data transmitted may also be lowered as necessary. For example, the resolution of images transmitted to remote computer system 106 may be lowered by applying or increasing compression when latency is high and/or bandwidth is low. One option for reducing the quantity of data transmitted is to lower the resolution of the images in their entirety. However, indiscriminate compression of images can lead to loss of important details. As an alternative, compression can be selectively performed on different portions of an image. Image processing, including compression, can be implemented using image processing logic 122.

Image processing logic 122 can generate image data for transmission to the remote computer system 106. The image data can be transmitted in one or more data streams (e.g., video streams), based on real-time processing of images captured by one or more of the sensors 114. The image data can represent, in a computer-readable format, a visual representation of a surrounding environment. The visual representation can correspond to a single image displayed at the remote computer system 106 or a plurality of images, for example, multiple images that are simultaneously displayed on different display devices of the remote computer system 106. Thus, a data stream can comprise a plurality of sequentially transmitted visual representations or a select portion of the plurality of sequentially transmitted visual representations. In certain embodiments, the sensors 114 may include multiple cameras in different locations throughout the vehicle, in which case the image data transmitted to the remote computer system 106 can include a separate stream for each camera. In some embodiments, the image processing logic 122 may combine images from different cameras by stitching the images together to form a single image as an aggregated camera view of the surrounding environment.

The image data transmitted to the remote computer system 106 can be transmitted in a format different from that of the images that are ultimately displayed at the remote computer system 106. For example, in some embodiments, stitching of images can be performed by the remote computer system 106 to generate a single image for display by combining individual images sent from the vehicle system 102. Further, in some embodiments, the displayed images can include visual elements that are not directly captured by a camera or other image sensor, but are instead generated based on data relating to the vehicle and/or the surrounding environment. Thus, data sent from the vehicle system 102 to the remote computer system 106 via the network 108 can include, among other things, raw images (e.g., a direct output of a camera), processed images (e.g., encoded images that have been compressed or composite images corresponding to an aggregated camera view), and/or metadata for augmenting images with visual elements.

Additionally, the transmitted image data does not have to be in one-to-one correspondence to the images displayed at the remote computer system 106. For instance, in some embodiments, the remote computer system can include a virtual reality (VR) display that enables a remote operator to adjust a viewing direction by moving his or her head. To support real-time display of images in a VR environment, the transmitted image data can include data for generating additional images besides an image corresponding to the remote operator's immediate field of view (e.g., the direction in which the remote operator is presently looking).

The image processing logic 122 can encode the image data for transmission to the remote computer system 106. The encoding can involve compressing all or a portion of a visual representation, which can then be decoded by the remote computer system 106 for output on one or more display devices. As explained in further detail below, different portions of an image can be compressed to different extents, e.g., by individually setting the compression ratio for different portions of the visual representation. Compression can be performed using a standard compression method such as those specified by the Moving Picture Experts Group (MPEG) or the Joint Photographic Experts Group (JPEG). The compression can be applied to the image data for the visual representation, e.g., to digital values that indicate the binary, grayscale, or color value of each pixel in the visual representation. To determine how to compress different portions of a visual representation, the image processing logic 122 and/or the data analysis logic (described below) can classify one or more portions as corresponding to a region of interest. Regions of interest can be compressed at a lower compression ratio (i.e., with less compression) compared regions that are not of interest.

A region of interest can be a specific portion of a visual representation, for example, a particular image segment. A region of interest can be a box or other geometric shape approximating the boundaries of some feature in the surrounding environment (e.g., a pedestrian or vehicle). Multiple regions of interest can be identified for any particular visual representation (e.g., different segments within a single image or segments across multiple images that make up the visual representation). Alternatively, a region of interest can be an entire image selected from among multiple images that are to be displayed simultaneously. For example, the remote computer system 106 may include multiple display devices, each displaying an image corresponding to a respective camera view. In such display configurations, a region of interest can be defined as corresponding to the image shown on a particular display, i.e., the region of interest can correspond to an entire display screen.

In some embodiments, the image processing logic 122 performs selective compression in response to the vehicle system 102 determining that the quality of the connection between vehicle system 102 and remote computer system 106 has fallen below a certain threshold (e.g., a bandwidth threshold). As mentioned earlier, the communication logic 120 may monitor a transmission speed of each wireless link 110. If the transmission speed is below the threshold, the image processing logic 122 can perform selective compression. If the transmission speed is not below the threshold, the image processing logic 122 can perform uniform compression or omit compression altogether (e.g., sending raw images). If multiple wireless links are available, such as, wireless links 110A and 110B, the communication logic 120 can, in some instances, switch to a different link before resorting to selective compression.

The determination of whether or not a portion of a visual representation corresponds to a region of interest can be based on data captured by vehicle sensors (e.g., one or more of the sensors 114) and/or data captured by the remote computer system (e.g., information from the driver monitoring system 128). Various techniques for identifying regions of interest are described herein. A region of interest can include an area around the current trajectory of the vehicle. A region of interest can be a portion corresponding to a direction in which the remote operator is gazing or facing. A region of interest can also be a portion containing a feature that the vehicle system 102 determines to be relevant to remote operation. Relevant features can include potential hazards (e.g., other vehicles or pedestrians), traffic signs, traffic lights, road features (e.g., lane markers or crosswalks), among other things.

Data analysis logic 124 can be configured to identify features in the surrounding environment based on data captured by the sensors 114, and to determine whether any of the identified features are relevant. If so, the data analysis logic 124 can output, to the image processing logic 122, an indication of where these features are located. The location indication can, for instance, include one or more coordinates in a two-dimensional or three-dimensional coordinate system. The image processing logic 122 can map the indicated locations to image data being generated for transmission to the remote computer system 106. For instance, the image processing logic 122 may define a region of interest as a bounding box or outline around the indicated location.

In some embodiments, relevant features are identified by using sensor fusion to determine attributes of features in the surrounding environment. Fusion refers to a process of combining sensor data from a plurality of sources (e.g. multiple sensors 114) to determine information not available when the data sources are considered individually. For example, in certain embodiments, a distance to an object may be calculated through fusion of image data from multiple cameras or fusion of camera data with non-camera data. Other attributes of features in the surrounding environment besides distance can also be determined from sensor data and include, for example, the size, shape, location, speed, and/or trajectory of an object.

Relevance can be determined by applying sensor data as input to a detection algorithm, e.g., a computer vision algorithm operating on sensor data, which can include image data, possibly in combination with non-image data. In some embodiments, relevance is determined by inputting sensor data to one or more machine learning algorithms, e.g., to an algorithm that implements a neural network configured to recognize different categorizes of features. Algorithms for determining relevance can be implemented in software and/or hardware, as part of the data analysis logic 124.

Data analysis logic can be further configured to determine the vehicle's current trajectory based on data captured by one or more sensors 114 and/or data sent from the remote computer system 106. The trajectory can, for example, be calculated based on the steering angle of a steering input sent from the remote computer system 106 in combination with vehicle speed, where the vehicle speed is measured, for example, by an accelerometer. In some embodiments, the trajectory is calculated without the aid of information from the remote computer system. For instance, vehicle speed, vehicle orientation and/or other trajectory related information can be determined based on data from the sensors 114 (e.g., accelerometer, GPS, or gyroscope data) and used to calculate the trajectory.

Remote computer system 106 may comprise one or more computing devices that facilitate remote operation of the vehicle through communication with teleoperation system 104. For example, remote computer system 106 may comprise one or more cloud server computers that are situated remotely from vehicle system 102. As illustrated in FIG. 1, the remote computer system 106 can include image reconstruction logic 126, remote control system 140, and driver monitoring system 128.

Image reconstruction logic 126 can be implemented using software instructions stored on computer readable media. Processing described with respect to the various components of the image reconstruction logic 126 can also be implemented in hardware or a combination of hardware and software. The image reconstruction logic 126 can be configured to reconstruct images from image data sent by the vehicle system 102. Reconstruction can include decoding and/or decompressing visual representations for display at the remote control system 140. In some embodiments, the image reconstruction logic 126 may receive image data in one or more video streams. The video streams can include a stream of data corresponding to an aggregated camera view. Alternatively, the video stream can include separate streams for different cameras, in which case the image reconstruction logic 126 can stitch the streams together to form an aggregated camera view, or send the streams for output on different displays of the remote control system 140.

In certain embodiments, the image reconstruction logic 126 may be configured to generate images for display by the remote control system 140 based on non-image data sent from the vehicle system 102. For example, the displayed images can be generated based at least in part on metadata describing the location, size, speed, or other attributes of features in the surrounding environment.

Remote control system 140 may comprise one or more computing devices that receive input from a human operator (i.e., the remote operator) and generate driving instructions for transmission to vehicle system 102. The driving instructions can be transmitted as wireless signals, using the same or a different wireless link as that used to send image data to the remote computer system 106. The driving instructions can be converted (e.g., by one or more of the ECUs 112) into commands for maneuvering the vehicle in accordance with the driving instructions. A driving instruction can be based on a steering input, an acceleration input, a braking input, and/or other inputs supplied by the remote operator.

Remote control system 140 can include one or more display devices that output images corresponding to the image data sent by the vehicle system 102. The images can be displayed in a graphical user interface. The remote control system 140 can also include additional input or output devices such as devices that receive driving inputs from the remote operator. Details of an example remote control system that can be used to implement the remote control system 140 are described below with reference to FIG. 3.

Driver monitoring system 128 can include one or more sensors configured to capture information about the physical state of the remote operator. For example, the driver monitoring system 128 may include an eye tracking sensor that captures movement of one or more of the remote operator's eyes to determine a gaze direction. As another example, the driver monitoring system 128 can include a head tracking sensor that captures movement of the remote operator's head in order to determine the direction in which the remote operator is facing. Other examples of sensors that can be included in driver monitoring system 128 include body posture sensors, breathing rate sensors, and heart rate sensors.

The data captured by the driver monitoring system 128 can be used for determining the compression parameters used to compress a visual representation being sent from the vehicle system 102 to the remote computer system 106. Thus, eye movement, head movement, and/or other physiological information pertaining to the remote operator can be used as input to the vehicle system 102. In certain embodiments, the data captured by the driver monitoring system 128 is used to determine regions of interest. For example, a region of interest can be determined to be an area where the remote operator is gazing/facing. In certain embodiments, the data captured by the driver monitoring system 128 is used to determine the extent to which an image should be compressed.

FIG. 2 illustrates an example configuration of sensors that can be used to implement the sensors 114 of vehicle system 102. Each of the sensors described in connection with FIG. 2 may send and/or receive signals (e.g., signals broadcast into the surrounding environment) that are processed to determine attributes of features (e.g., physical objects) in the surrounding environment. FIG. 2 is merely provided as an example. Other configurations (e.g., configurations comprising sensors not illustrated in FIG. 2) are also contemplated to be within the scope of the disclosure. For example, one or more sensors may be omitted from FIG. 2, placed at another location in FIG. 2, consolidated with another sensor illustrated in FIG. 2, and/or added to FIG. 2 without departing from the scope of the disclosure or the spirit of the appended claims.

In the example of FIG. 2, vehicle 200 includes a plurality of sensors disposed at various locations throughout the vehicle. The plurality of sensors comprise cameras 201-204, ultrasonic sensor 206, radar sensors 208 and 210, and LIDAR sensor 212. Each of these sensors may generate signals that provide information relating to vehicle 200 and/or an environment external to the vehicle.

Cameras 201-204 may be used to provide visual information relating to the vehicle 200 and/or its surroundings. Cameras 201-204 may comprise a wide-angle lens, such as a fisheye lens that can provide, for example, a 190-degree angle of view. Multiple cameras may provide multiple views that can be stitched together to form an aggregate view. For example, images from cameras located at each side of the vehicle 200 can be stitched together to form a 360-degree view of the vehicle and/or its environment. In certain embodiments, the 360-degree view may be provided from an overhead perspective, e.g., a perspective looking down on the vehicle at a 45-degree angle.

FIG. 2 illustrates a row of ultrasonic sensors across the front bumper of the vehicle 200. The row of ultrasonic sensors includes the ultrasonic sensor 206, which is an example of a sensor located at a corner of the front bumper. The ultrasonic sensors emit ultrasonic waves that can be used by vehicle system 102 to detect objects (e.g., people, structures, and/or other vehicles) in the surrounding environment. In some embodiments, the vehicle system 102 may use the ultrasonic waves to determine speeds, positions (including distances), and/or other attributes of the objects relative to the vehicle.

Radar sensors, such as radar sensors 208 and 210, emit radio waves that can be used by vehicle system 102 to detect objects (e.g., people, structures, and/or other vehicles) in the surrounding environment. In some embodiments, the vehicle system 102 may use the radio waves to determine speeds, positions (including distances), and/or other attributes of the objects. As illustrated in FIG. 2, radar sensor 208 is an example of a sensor located at a corner of the front bumper, and radar sensor 210 is located on the front fascia of the vehicle.

LIDAR sensors, such as LIDAR sensor 212, may emit infrared laser light that can be used by vehicle system 102 to detect objects (e.g., people, structures, and/or other vehicles) in the surrounding environment. In some embodiments, the vehicle system 102 may use the infrared laser light to determine speeds, positions (including distances), and/or other attributes of the objects. In the example of FIG. 2, LIDAR sensor 212 is located toward a bottom portion of the vehicle.

Although a rear perspective view of vehicle 200 is not shown in FIG. 2, it should be appreciated that such a view may comprise a similar configuration of sensors. For example, cameras may be located near the upper edge of the rear window, near the center of the rear bumper, and/or on the right-side mirror of the vehicle; a row of ultrasonic sensors may be located across the rear bumper, including the corners; radar sensors may be located on the rear fascia and bumper corners; and/or a LIDAR sensor may be located near the center of the rear bumper, and/or on top of the vehicle. Each of the aforementioned sensors, alone or in combination with another sensor, may be used to implement various features of vehicle system 102.

Figure 3:
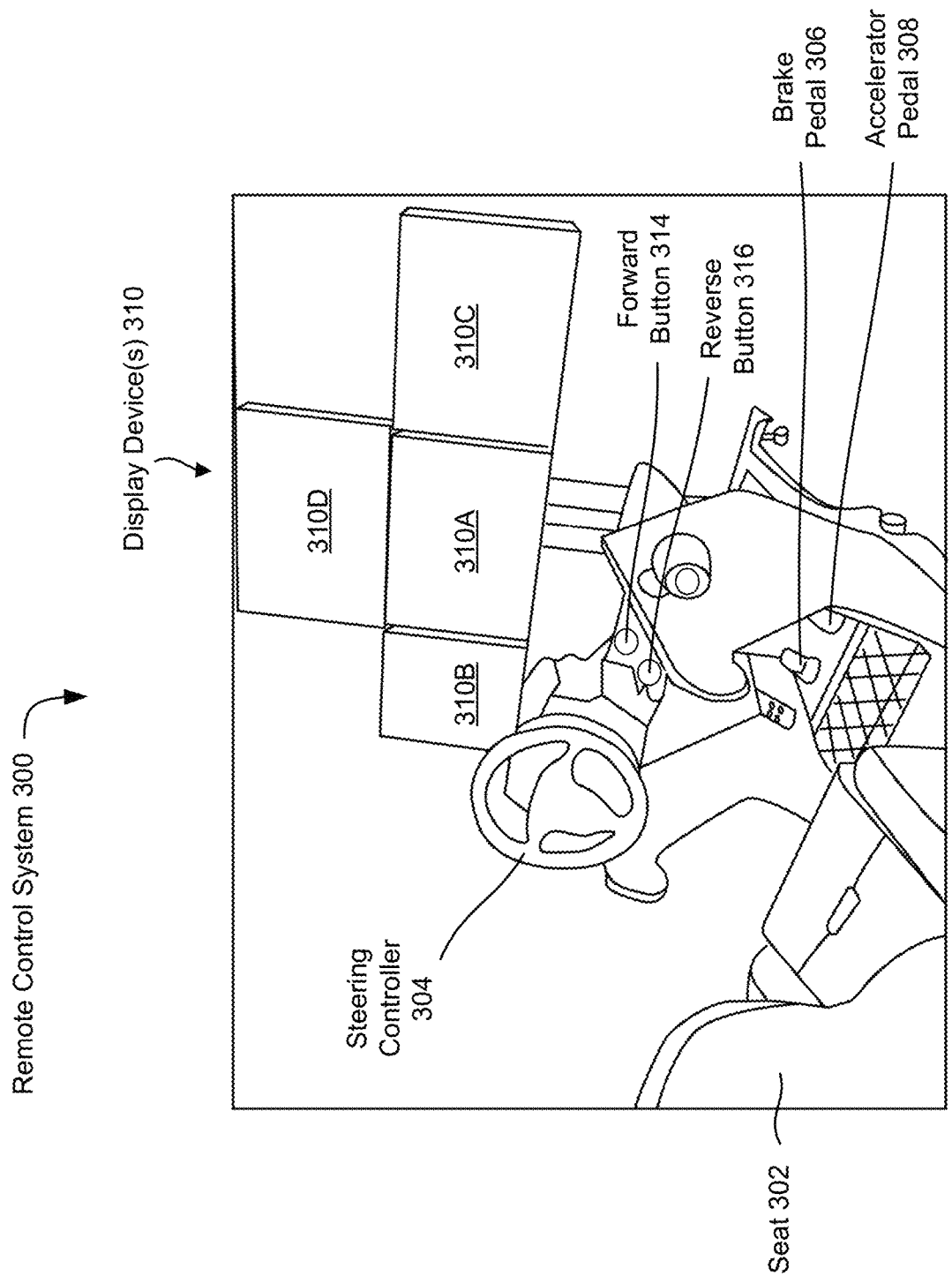
FIG. 3 illustrates an example remote control system that may be incorporated into a computing environment, in accordance with one or more embodiments.

FIG. 3 illustrates an example remote control system 300 that can be used to implement the remote control system 140 in FIG. 1. Remote control system 300 enables a user (i.e., the remote operator) to remotely operate a vehicle through communication between remote control system 300 and a vehicle system (e.g., vehicle system 102).

Remote control system 300 comprises a set of components that provide output to and receive input from the remote operator. These components may include, for example, one or more display devices 310, a seat 302, a steering controller 304, a brake pedal 306, an accelerator pedal 308, a forward button 314, and a reverse button 316. FIG. 3 is merely provided as an example. Other configurations (e.g., configurations comprising components not illustrated in FIG. 3) are also contemplated to be within the scope of the disclosure. For example, one or more components may be omitted from FIG. 3, placed at another location in FIG. 3, consolidated with another component illustrated in FIG. 3, and/or added to FIG. 3 without departing from the scope of the disclosure or the spirit of the appended claims.

Display device(s) 310 may be used to present a visual representation of a surrounding environment to the remote operator. The visual representation corresponds to the image data sent by a vehicle system. The visual representation can be transmitted in compressed form (e.g., after applying selective compression in accordance with the embodiments described herein) for display on the display device(s) 310. As illustrated in FIG. 3, the display devices can include an arrangement of display devices 310A-310D stacked together. Although FIG. 3 illustrates display devices 310A-310D in an upside-down "T" configuration of four flat screens, it should be appreciated that other configurations are also contemplated to be within the scope of the disclosure. For example, in some embodiments, display device(s) 310 may comprise a single curved screen that presents a visual representation incorporating a panoramic (e.g., 360-degree) view stitched together from multiple cameras. As mentioned earlier, virtual reality displays are also possible.

In certain embodiments, each display device 310 can be configured to display a different portion of a visual representation. For example, display device 310A may show images captured by a front facing camera, display device 310B may show images captured by a left facing camera, display device 310C may show images captured by a right facing camera, and display device 310D may show images captured by a rear facing camera. Thus, in some instances, each display device 310 may generate images based on a separate video stream. Each video stream can correspond to a different camera view and can be individually transmitted from the vehicle computer system to the remote computer system of the remote control system 300. Alternatively, the vehicle computer system can transmit a single video stream, with the video stream being split by the remote computer system for output on different display devices 310 or shown on a single display device.

The remote operator may view display device(s) 310 from a cockpit comprising seat 302 and a plurality of devices that enable remote operation of the vehicle responsive to output provided at the remote control system 300. Examples of such output include, but are not limited to, a visual representation presented via display device(s) 310, audio from a speaker (not shown), and/or haptic feedback from the steering controller 304. The remote control system 300 can maneuver the vehicle in response to input provided by the remote operator using any of the input devices mentioned above. For example, steering controller 304 may generate a signal for causing the vehicle to make a turn; brake pedal 306 may generate a signal for causing the vehicle to slow or stop; accelerator pedal 308 may generate a signal for causing the vehicle to increase its speed; forward button 314 may generate a signal for controlling a transmission system of vehicle system 102 to drive the vehicle forward, and reverse button 316 may generate a signal for controlling the transmission system to drive the vehicle in reverse.

Although not shown in FIG. 3, the remote control system 300 can be integrated or co-located with one or more components of a driver monitoring system that implements the driver monitoring system 128 of FIG. 1. For instance, image sensors (e.g., color or infrared cameras) can be mounted on or near the display devices 310. In one embodiment, an image sensor mounted on top of display device 310B could track movement of the remote operator's eyes. In a virtual reality implementation of a remote control system, the display devices 310 could be replaced with a single, head-mounted display, and the driver monitoring system could include sensors integrated into the head-mounted display. Other sensors employed by the driver monitoring system could be placed in suitable locations around the remote control system 300. Some driver monitoring sensors may be wearable sensors, such as a heart rate sensor worn around a wrist or chest of the remote operator.

Figure 4:
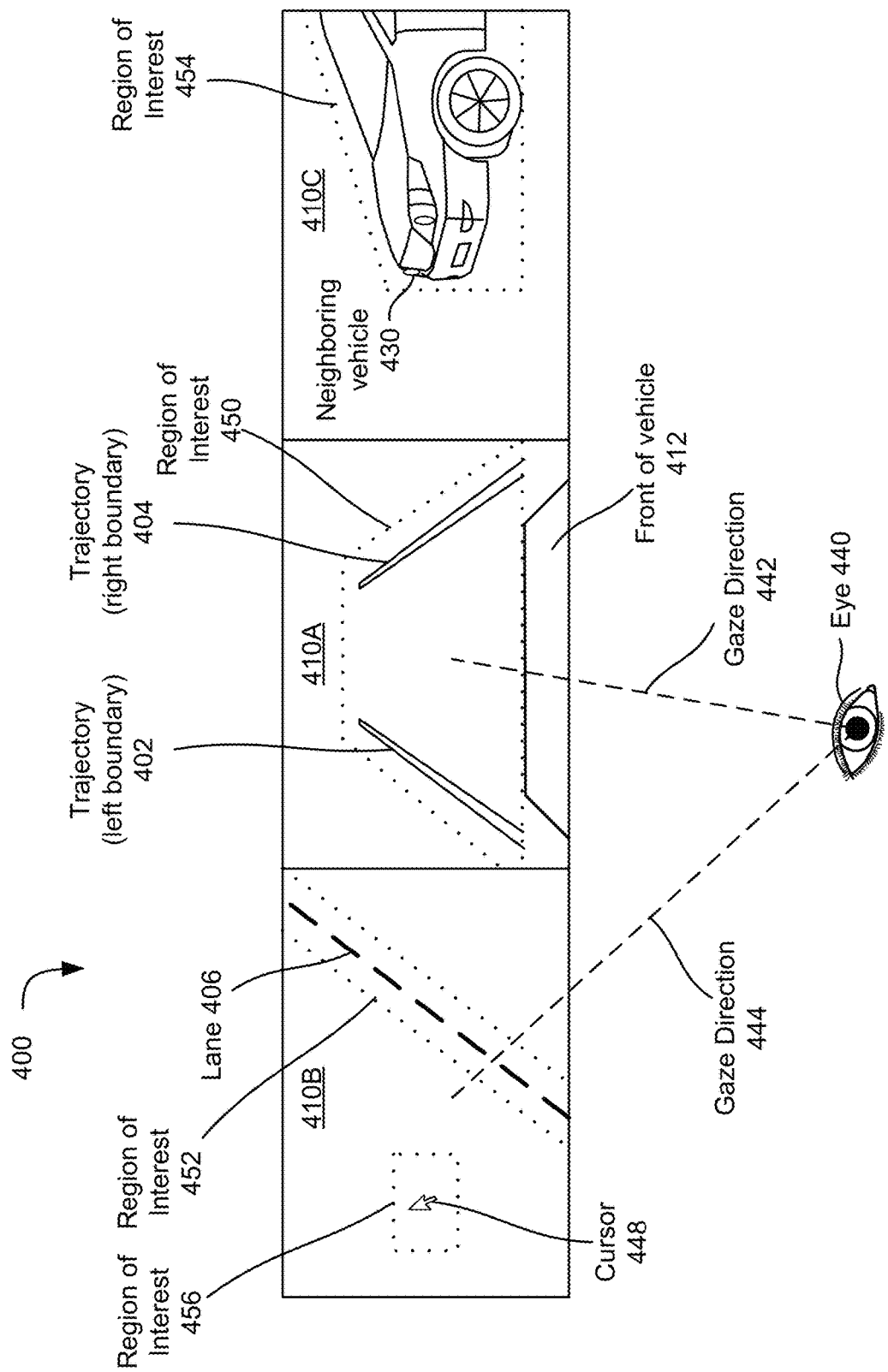
FIG. 4 illustrates an example of a visual representation containing various regions that can be selectively compressed for display to a remote operator.

FIG. 4 illustrates an example of a visual representation 400 containing various elements that can be selectively compressed for display to a remote operator. The visual representation 400 comprises three images, each image displayed on a separate display device 410. FIG. 4 is intended to provide examples of features that can correspond to regions of interest. FIG. 4 does not show the result of compression applied to image data being transmitted for display at a remote computer system. Such compression would be performed at the vehicle system prior to transmission of the image data to the remote computer system. The images ultimately displayed on the display devices 410 could be formed by decoding and/or decompressing the image data to form a corresponding visual representation that, by virtue of the earlier compression performed by the vehicle system, has less detail than the original visual representation.

As illustrated in FIG. 4, a first display device 410A shows an image corresponding to a view of a front facing camera of the vehicle (e.g., camera 201 in FIG. 2). The image shown by the display device 410A includes a view of the front 412 of the vehicle. Additionally, the display device 410A shows elements not captured by the front facing camera, but which are added onto the captured image. In particular, the display device 410A shows a left boundary 402 and a right boundary 404 of a vehicle trajectory. As mentioned earlier, the trajectory can be calculated based on data captured by vehicle sensors and/or driving input from the remote computer system. The boundaries 402, 404 may correspond to an estimate of the path that the vehicle would follow based on the vehicle's present orientation and the driving maneuver currently being executed. In some embodiments, a trajectory can be represented as a single line or curve that represents the path followed by the vehicle.

A display device 410B shows an image corresponding to a view of a left facing camera (e.g., camera 204 in FIG. 2). The left facing camera can be positioned to capture images of the surrounding environment along the left side of the vehicle. In the example of FIG. 4, the image shown by display device 410B includes a lane 406.

A display device 410C shows an image corresponding to a view of a right facing camera. The right facing camera can be positioned to capture images of the surrounding environment along the right side of the vehicle. In the example of FIG. 4, the image shown by display device 410C includes a neighboring vehicle 430.

FIG. 4 also includes a representation of a gaze or facing direction of a remote operator relative to the images being displayed on the display devices 410A-C. As shown in the figure, an eye 440 of the remote operator can move between different display devices. For example, the remote operator might be gazing in a direction 442 toward the display device 410A during a majority of the time that the vehicle is being remotely operated. Further, the remote operator may occasionally look away from the display device 410A, for example, in a direction 444 toward display 410B in preparation for executing a lane change maneuver across the lane 406.

Assuming that selective compression has been activated (e.g., based on a measured bandwidth falling below a certain threshold), the elements displayed by the display devices 410 can be compressed in different ways. First, the vehicle system (e.g., vehicle system 102 in FIG. 1) may define various regions of interest, including a first region 450 around the boundaries 402, 404 of the trajectory, a second region 452 around the lane 406, and a third region 454 around the vehicle 430. In some embodiments, portions corresponding to the vehicle being remotely operated (e.g., the front 412) are eliminated from consideration as regions of interest. As shown in FIG. 4, the regions of interest can be defined to encompass a certain amount of image area beyond the boundaries of the relevant feature. The vehicle system may determine the degree to which the regions of interest extend beyond the feature boundaries in order to meet a margin of error for safety. Alternatively, in some embodiments, the vehicle system may define the region of interest to approximate the boundaries of the feature as closely as possible.

Regions of interest can also be defined based on gaze or face direction. In some embodiments, the entire image shown on a display device can be classified as a region of interest based on the direction of the remote operator. For example, assuming the remote operator is currently looking in direction 442, the entire image shown on display device 410A could be classified as a region of interest. Further, in the example where the remote operator is switching between direction 442 and direction 444, the images on display devices 410A and 410B could both be classified as regions of interest. Additionally, in some embodiments, the vehicle system can define a region of interest by mapping the gaze/face direction to a specific portion of an image. For instance, the vehicle system could define the region of interest 452 based on determining that the direction 444 corresponds to the remote operator looking at the lane 406.

In some embodiments, regions of interest can be explicitly identified by the remote operator. For example, a region of interest 456 can be defined around a cursor 448. The remote operator can control the cursor 448, e.g., using a mouse or trackpad, in order to manually specify a region of interest. The size and/or shape of a manually specified region of interest 456 may be adjustable, for example based on parameters selected by the remote operator. As another example, the remote operator may toggle between different "active" screens, e.g., using the arrow keys on a keyboard, to select the image of one of the display devices 410A-410C as being of interest at a particular time.

After defining the regions of interest, the vehicle system can determine an appropriate compression ratio for each region of interest. The compression ratios can be the same for all regions of interest or vary between regions of interest. For instance, regions that correspond to vehicles (e.g., region 454) could be compressed at a higher ratio than regions corresponding to road features (e.g., region 452). As another example, if the remote operator spends a majority of time looking in direction 442, the compression ratio for region 450 could be set lower than the compression ratio for region 452. Further, the vehicle system may specify a higher compression ratio for portions that do not correspond to regions of interest (e.g., any image segment located outside of the regions 450, 452, 454, and 456).

Figure 5:
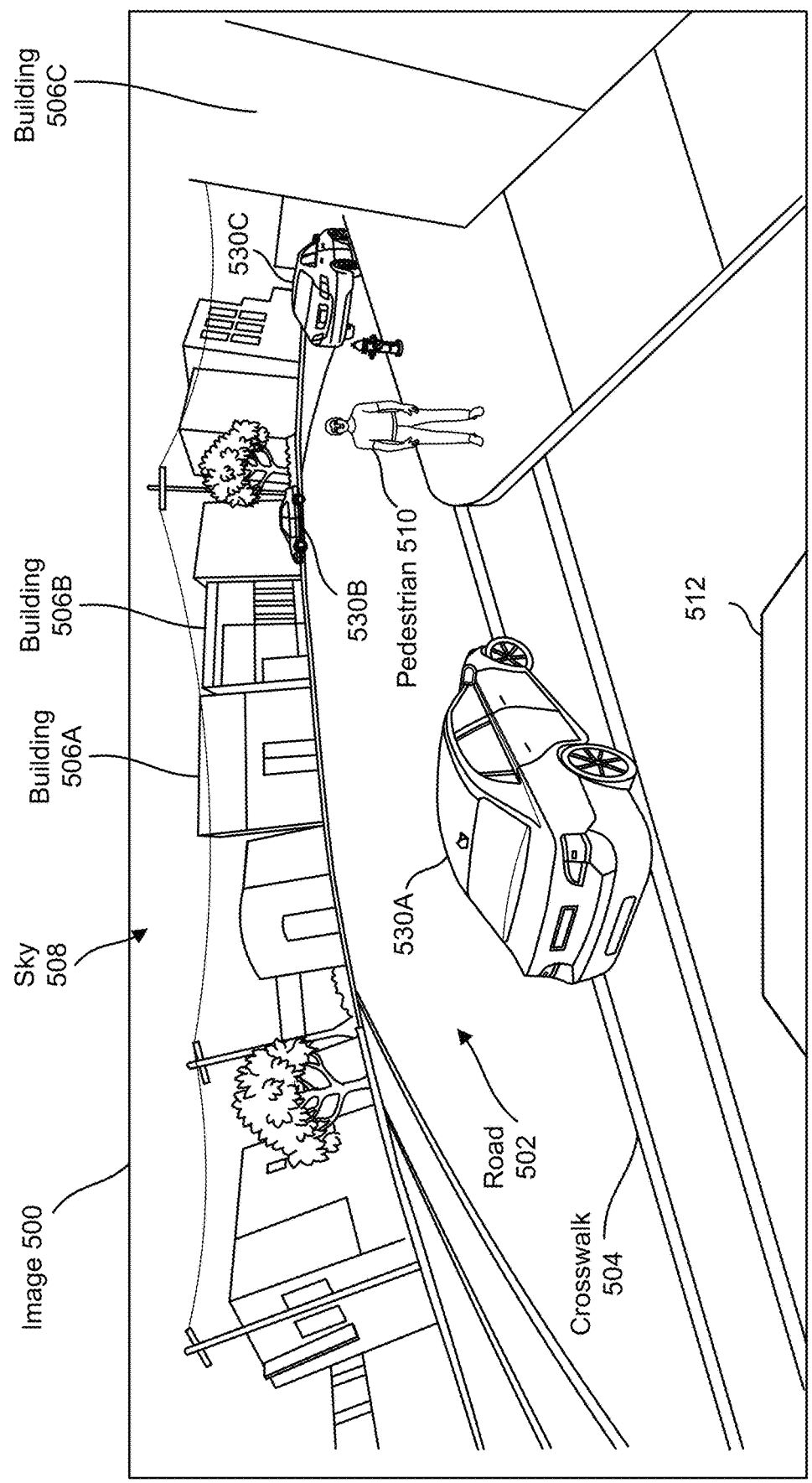
FIG. 5 illustrates an example of a visual representation corresponding to an aggregated camera view.

FIG. 5 illustrates an example of a visual representation corresponding to an aggregated camera view. The visual representation in FIG. 5 comprises a single image 500 formed by stitching together images captured by different cameras. The image 500 can be transmitted to a remote computer system for display on a single display device (e.g., a widescreen monitor) or for splitting into different images for simultaneous display on multiple display devices. As with the example of FIG. 4, the image 500 does not show the results of compression. Instead, an example of a compressed version of the image 500 is shown in FIG. 6.

In some embodiments, the vehicle system may send image data for multiple compressed images to the remote computer system, and the remote computer system may be configured to decompress and then stitch these images together to form a single image, e.g., an image corresponding to a compressed version of the image 500.

The image 500 depicts a scene including the surrounding environment around a remotely operated vehicle. Similar to FIG. 4, the image 500 shows a portion of a front 512 of the vehicle. The image 500 includes features for which regions of interest can be defined, as well as features that may be deemed irrelevant or of lesser importance. Examples of relevant features include road features, other vehicles, and pedestrians. Examples of features that may not be deemed relevant include background scenery, e.g., the sky, buildings, trees, etc. Specific instances of example features are labeled in FIG. 5 and include a road 502, a crosswalk 504, buildings 506, a sky 508, a pedestrian 510, and vehicles 530 other than the vehicle being remotely operated.

Figure 6:
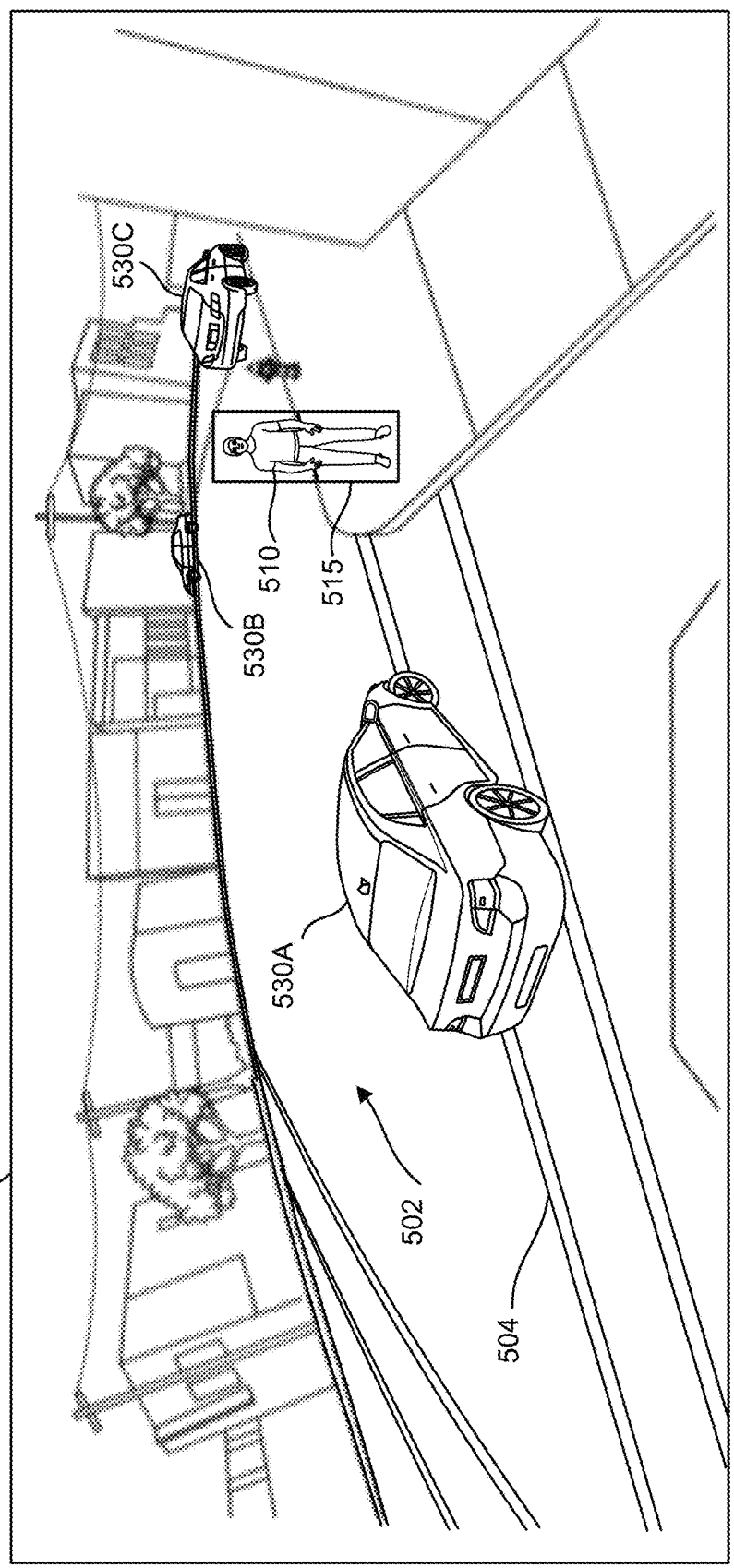
FIG. 6 illustrates an example result of selectively compressing the visual representation shown in FIG. 5, in accordance with an example embodiment.

FIG. 6 illustrates an image 600 corresponding to a compressed version of the image 500 in FIG. 5. The image 500 has been modified to reduce the level of detail in certain image segments, in order to represent the effects of selective compression. As shown in FIG. 6, the road 502, the crosswalk 504, the vehicles 530A, 530B, and 530C, and the pedestrian 510 are displayed with substantially the same amount of clarity as in FIG. 5. The image 500 can be generated by defining regions of interest around the features 502, 504, 530A-C, and 510 in the same manner described in connection with FIG. 4. Such regions of interest can be compressed with a lower ratio compared to areas that do not correspond to regions of interest. Accordingly, FIG. 6 shows other features from the image 500 with less clarity in order to represent the effects of applying a higher compression ratio to the areas around those features. Reference labels for features that are compressed at a higher ratio have been omitted from FIG. 6 for simplicity.

In addition to selective compression, the image 600 can include augmented elements designed to draw the attention of the remote operator. Augmented elements can be used alone or in combination with a lower compression ratio in order to emphasize the presence of certain features. For example, FIG. 6 shows a box 515 drawn around the pedestrian 510. Other forms of augmentation are also possible including, for example, highlighting in different colors depending on the category of feature (e.g., red for pedestrians and yellow for vehicles), and displaying attributes of the feature (e.g., text indicating the size, speed, or distance of the feature), highlighting a traffic sign in vicinity, speed limit information, and the like.

In some embodiments, regions of interest may be defined for features that have been identified as being relevant based on machine learning. For instance, the vehicle system 102 can include, as part of the data analysis logic 124, a neural network processor that executes a deep neural network. Neural networks model the behavior of human brains using layers of nodes, with the nodes performing various computations upon input data (e.g., an image) to arrive at an inference (e.g., whether or not there is an pedestrian in the input image). Whereas a neural network can include as few as a single layer, deep neural networks can include many layers, sometimes hundreds or even thousands. The neural network executed by the vehicle system 102 could be programmed and trained to detect the presence of certain categories of features (e.g., sky, building, pedestrians, vehicles, lane markers, traffic lights, etc.). In some embodiments, the output of the neural network may comprise a decision as to whether a particular segment of an image contains a relevant feature (e.g., a yes or no decision) rather than an explicit categorization of features.

A less computationally intensive alternative to machine learning is to use a computer vision algorithm. Unlike machine learning algorithms, computer vision algorithms generally do not have the ability to adapt to past inputs, but are instead pre-programmed to make decisions based on image input. For example, a computer vision algorithm might include program code for identifying an object as being a pedestrian based on a fixed set of criteria such as the overall shape of the object, indicators of the presence of a face, the speed with which the object is moving from one image to the next, etc. A vehicle system executing a computer vision algorithm in accordance with the present disclosure may operate on additional data besides image data in order to identify regions of interest and/or categorize features. For instance, the computer vision algorithm can fuse image data with data captured by non-imaging sensors of the vehicle to identify an object in the surrounding environment.

FIGS. 7-10 illustrate various methods in accordance with embodiments of the present disclosure. The methods of FIGS. 7-10 can be combined or performed separately. For instance, different techniques for identifying regions of interest may be combined to form a set of regions of interest, where each region of interest is compressed to a lesser extent than regions that are not of interest. The processing shown in FIGS. 7-10 may be implemented in software (e.g., program code) executed by one or more processing units (e.g., an ECU or processor of a teleoperation system) of the respective systems, hardware, or combinations thereof. The software may be stored on a non-transitory storage medium (e.g., on a memory device). FIGS. 7-10 depict various processing steps occurring in a particular sequence or order. However, in other embodiments, the steps may be performed in a different order, in parallel, or certain steps may be omitted. In certain embodiments, such as in the embodiment depicted in FIG. 1, the processing depicted in FIGS. 7-10 may be performed by a vehicle system (e.g., the vehicle system 102).

Figure 7:
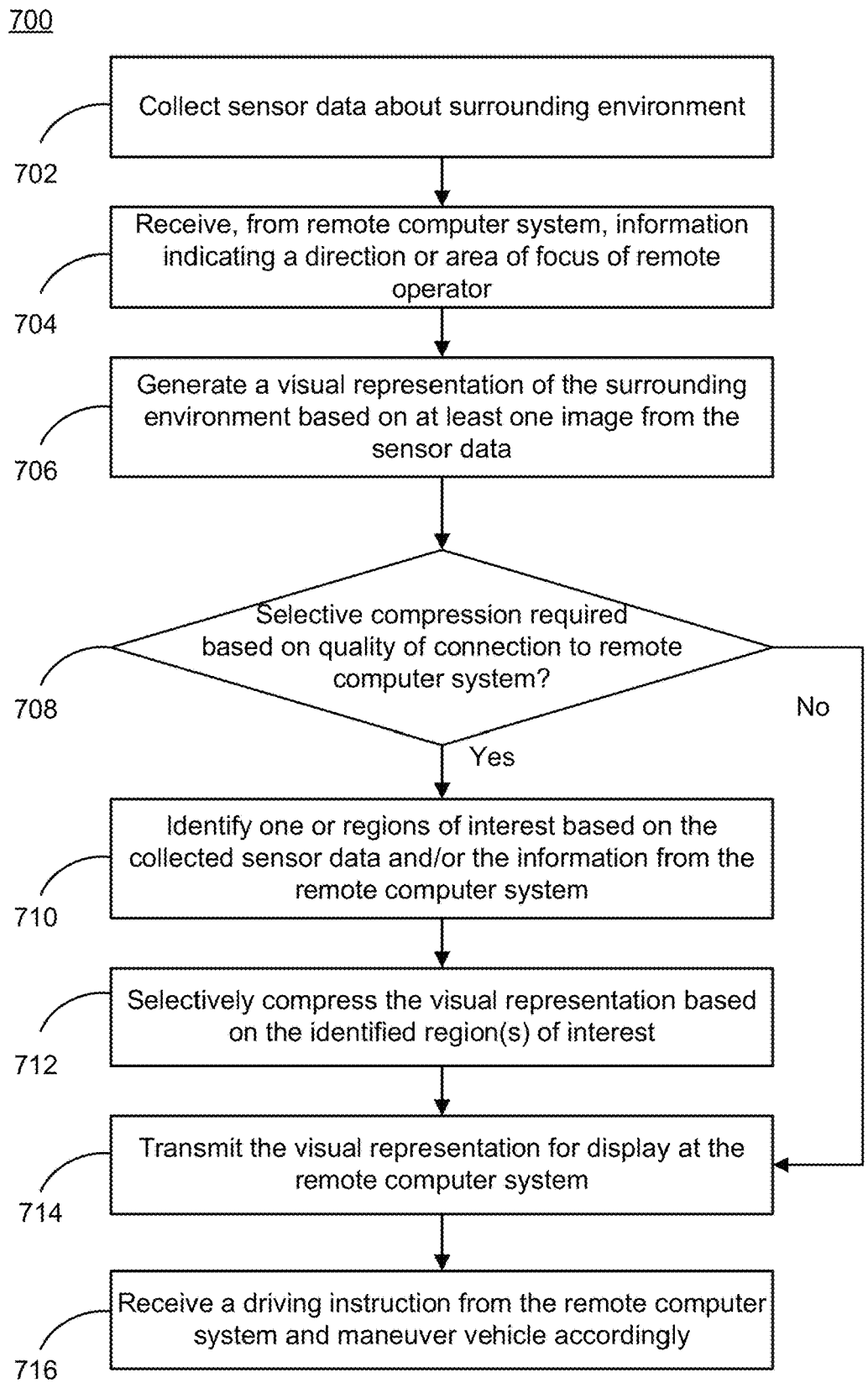
FIG. 7 is a flow chart illustrating a method for controlling a vehicle based on selective compression of images, in accordance with an example embodiment.

FIG. 7 is a flow chart illustrating a method 700 for remotely controlling a vehicle based on selective compression of images. At step 702, the vehicle system collects sensor data about the surrounding environment around the vehicle. The sensor data can be collected using one or more imaging sensors, such as a camera, and optionally one or more non-imaging sensors, such as the LIDAR, radar, and ultrasonic sensors shown in FIG. 2. The sensor data can be analyzed to determine attributes of features in the surrounding environment and information about the current state of the vehicle, such as the vehicle's speed and orientation. In particular, the sensor data can be used to determine a region of interest in step 710 below. Further, images captured by the imaging sensor(s) can be processed for transmission to the remote computer system, e.g., in one or more video streams.

At step 704, the vehicle system receives, from the remote computer system, information indicating a direction or area of focus of the remote operator. As explained earlier, the direction can be a direction in which the remote operator is gazing or facing with respect to an image output on a display device, where the direction is determined based on one or more sensors located at the remote computer system. An area of focus can correspond to, for example, a specific display device among a set of display devices, a display region extrapolated from the remote operator's gaze or face direction, or a specific position on a display screen (e.g., the coordinates of the cursor 448 in FIG. 4). Thus, the information received in step 704 can be formatted in various ways, including as display coordinates, an angular value, or using an identifier of a display device (e.g., "display number 1").

At step 706, the vehicle system generates a visual representation of the surrounding environment based on at least one image included in the sensor data collected in step 702. The visual representation can, for example, include a single image captured by camera, multiple images captured by different cameras, or a composite image formed by stitching together the images captured by the cameras.

At step 708, the vehicle system determines, based on the quality of the connection to the remote computer system, whether selective compression of the visual representation generated in step 706 is required. The connection can be a wireless link as shown in FIG. 1, and can be the same connection through which the information was received in step 704, or a different connection (e.g., a wireless link dedicated to video streaming). The quality of the connection can be determined, for example, based on measurements of bandwidth, latency, and/or throughput. In some embodiments, the measurements are performed by the vehicle system 102. Alternatively, the measurements can be performed by the remote computer system, which may send the measurements or a request for selective compression to the vehicle system. The vehicle system or the remote computer system may determine that selective compression is required based on the quality falling below a certain threshold, for example, a certain amount of data per second. If selective compression is required, the method proceeds to step 710. Otherwise, the method proceeds to step 714.

At step 710, the vehicle system identifies one or more regions of interest based on the sensor data collected in step 702 and/or based on the information received from the remote computer system in step 704. Examples of regions of interest were described earlier in connection with FIGS. 4 and 5.

At step 712, the vehicle system selectively compresses the visual representation based on the identified region(s) of interest. In particular, a portion of the visual representation (e.g., an image segment) corresponding to a region of interest can be compressed to a lesser extent than a portion of the visual representation not corresponding to a region of interest. The compression ratio for a region of interest can, for example, be calculated with respect to a compression ratio applied to regions that are not of interest, calculated based on the quality of the connection to the remote computer system (e.g., proportional to measured latency), or set to a preconfigured value.

At step 714, the vehicle system transmits the visual representation to the remote computer system for display to the remote operator. The visual representation can be transmitted over the connection for which the quality was determined in step 708. If the transmission of the visual representation follows a negative determination in step 708, then the visual representation may be transmitted uncompressed or uniformly compressed (e.g. at a compression ratio that is lower than that used for regions of interest). Upon receipt of the compressed visual representation, the remote computer system may decompress the visual representation for display.

At step 716, the vehicle system receives a driving instruction from the remote computer system and maneuvers the vehicle accordingly. The driving instruction can include, for example, acceleration or steering inputs provided by the remote operator in response to viewing a decompressed version of the visual representation transmitted in step 714.

Figure 8:
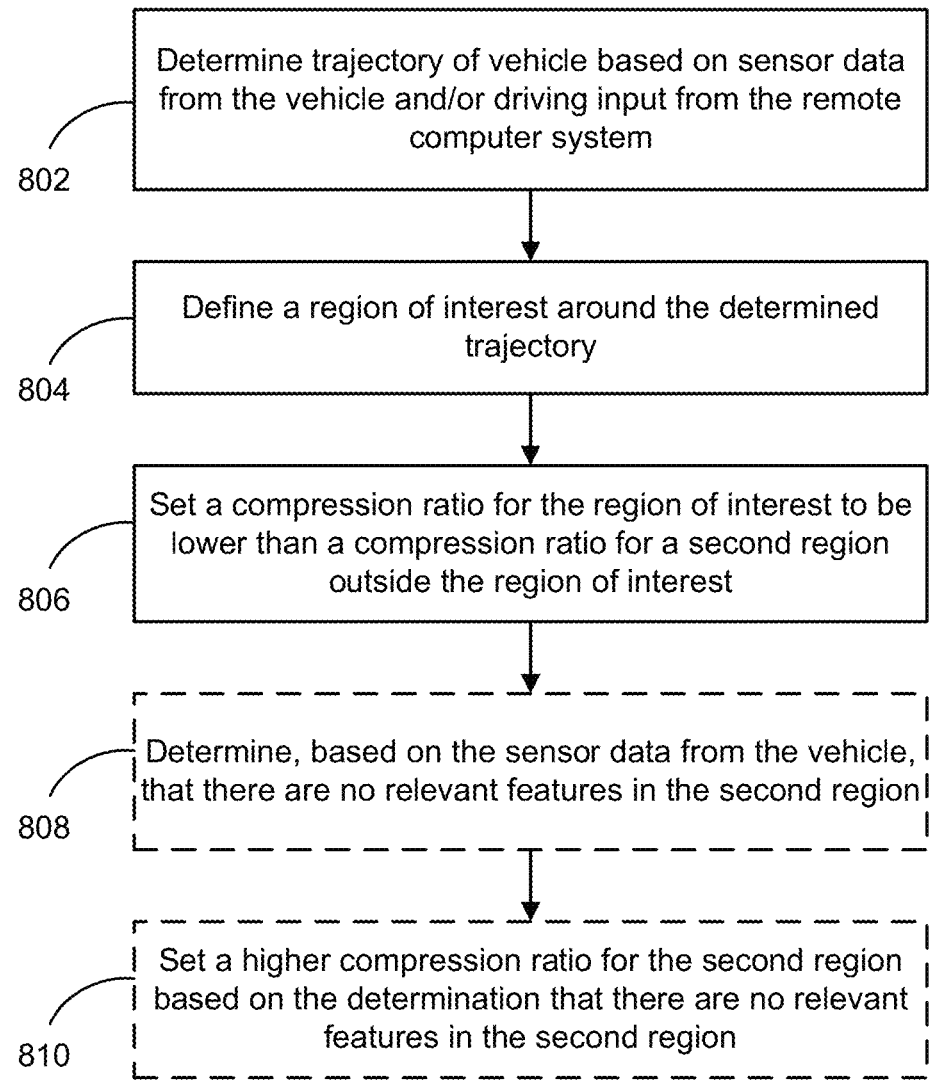
FIG. 8 is a flow chart illustrating a method for selectively compressing a visual representation based on a vehicle trajectory, in accordance with an example embodiment.

FIG. 8 is a flow chart illustrating a method 800 for selectively compressing a visual representation based on a vehicle trajectory and further based on detection of features in a surrounding environment. At step 802, the vehicle system determines a trajectory of the vehicle based on sensor data from the vehicle (e.g., the sensor data collected in step 702 of FIG. 7, vehicle odometry data, wheel angle, and the like) and/or driving input from the remote computer system. The sensor data can include, for example, information about the speed of the vehicle, the vehicle's current heading, or the orientation of the vehicle's tires. Driving input that can be used for determining the trajectory can include, for example, a steering angle value corresponding to the position of the steering controller 304 in FIG. 3 or an acceleration value corresponding to an extent to which the accelerator pedal 308 is pressed.

Step 804 corresponds to step 710 in FIG. 7. At step 804, the vehicle system defines a region of interest around the determined trajectory. For example, the vehicle system may define the region of interest to include an area extending a certain distance from a boundary of the trajectory, as shown in FIG. 4.

At step 806, the vehicle system sets a compression ratio for the region of interest to be lower than a compression ratio for a second region located outside the region of interest, so that the region of interest will be compressed to a lesser extent than the second region. The compression ratio for the region of interest can, for example, be set lower than a default compression ratio that is used for regions that are not of interest when performing selective compression.

Steps 808 and 810 are optional steps in which sensor data is used to determine how a region that is not of interest should be compressed. At step 808, the vehicle system determines, based on the sensor data from the vehicle, that there are no relevant features in the second region. For example, the vehicle system may recognize that there are no pedestrians, other vehicles, or road features in the second region.

At step 810, the vehicle system sets a higher compression ratio for the second region relative to the compression ratio set for the region of interest, and based on the determination in step 808 that there are no relevant features in the second region. For example, the compression ratio for the second region can be set at the default compression ratio or set higher than the default compression ratio.

Figure 9:
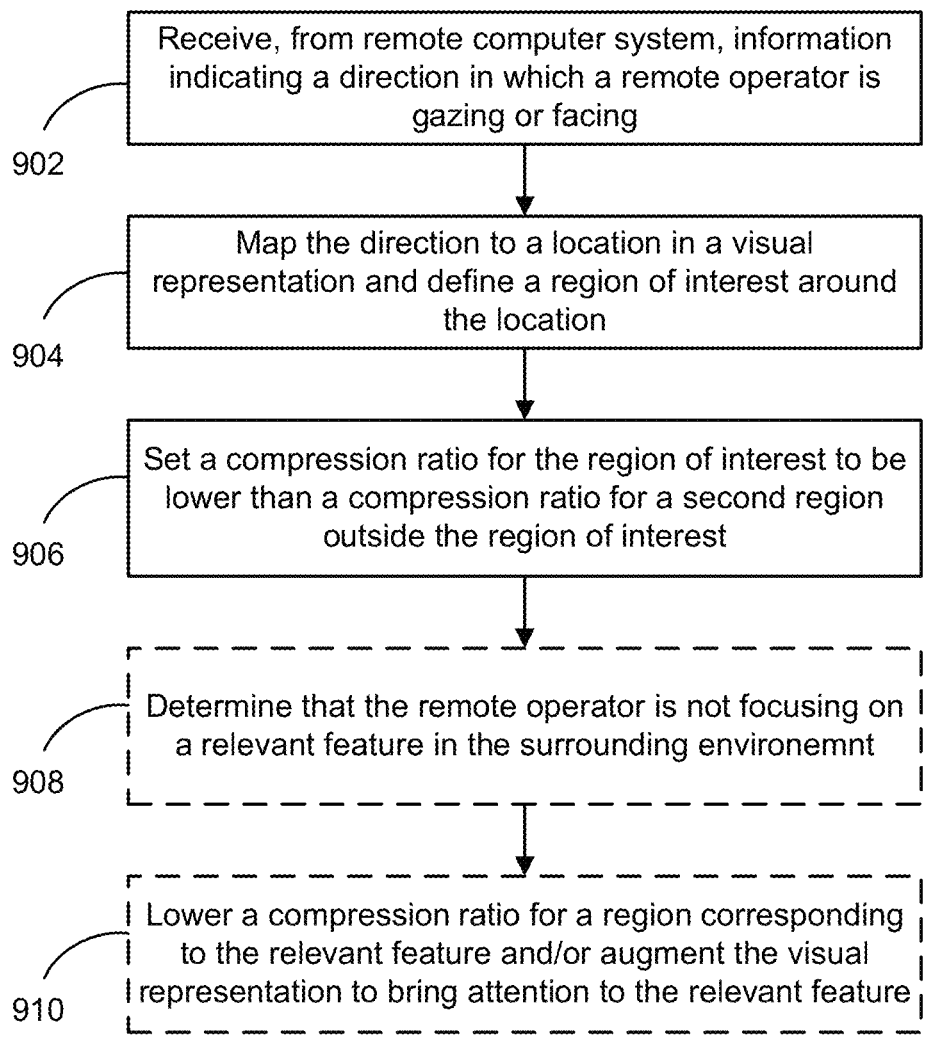
FIG. 9 is a flow chart illustrating a method for selectively compressing a visual representation based on information indicating a gaze or face direction of a remote operator, in accordance with an example embodiment.

FIG. 9 is a flow chart illustrating a method 900 for selectively compressing a visual representation based on information indicating a gaze or face direction of a remote operator. Step 902 corresponds to step 704 of FIG. 7. At step 902, the vehicle system receives, from a remote computer system (e.g., the remote computer system 106), information indicating a direction in which a remote operator is gazing or facing. As described earlier, the gaze or face direction can be detected using one or more sensors, such as an eye tracking sensor and/or a head tracking sensor, which can be integrated into a driver monitoring system that monitors a physical state of the remote operator. The direction of remote operator can be represented in various ways, including using display coordinates, an identifier of a display device, or other formats.

At step 904, the vehicle system maps the direction of the remote operator to a location in a visual representation to be transmitted to the remote computer system (e.g., the visual representation generated in step 706 of FIG. 7). For example, if the direction is indicated using a display coordinate, the display coordinate can be mapped to a corresponding coordinate in the visual representation. As another example, if the direction is indicated using an identifier of a display device, the location in the visual representation can be determined to correspond to a region, within the visual representation, that will be displayed on the identified display device.

Step 906 corresponds to step 806 of FIG. 8. At step 906, the vehicle system sets a compression ratio for the region of interest to be lower than a compression ratio for a second region outside the region of interest, so that the region of interest will be compressed to a lesser extent than the second region. For example, if the region of interest corresponds to a portion of the visual representation which is to be displayed on a particular display device, the compression ratio applied to that portion of the visual representation can be set lower compared to a compression ratio used for a portion of the visual representation which is to be displayed on a different display device.

In certain embodiments, the compression ratio for the region of interest can be determined taking into multiple directions into consideration. For example, the information received in step 902 may indicate that the remote operator is switching between looking at display device 410B and display device 410A, as discussed above in connection with FIG. 4. The compression ratio for the region of interest can be set based on the amount of time the remote operator spends in a particular direction. For instance, if the driver spends 70% of the time looking at display device 410A and 30% of the time looking at display device 410B, then the compression ratio for a region corresponding to display device 410A can be set lower than the compression ratio for a region corresponding to display device 410B.

Steps 908 and 910 are optional steps in which sensor data is used to set a lower compression ratio than would otherwise be set for a region corresponding to a relevant feature. At step 908, the vehicle system determines that the remote operator is not focusing on a relevant feature in the surrounding environment. The relevant feature can be detected through analysis of sensor data, e.g., by fusing data collected from different sensors in step 702 of FIG. 7. The vehicle system may be configured to recognize certain categories of features in the surrounding environment as being relevant including, for example, other vehicles, pedestrians, etc. The vehicle system may be further configured to determine when a particular category of feature should be deemed relevant. For example, a pedestrian may be determined to be a relevant feature based upon a determination that the pedestrian is currently within the vehicle's current trajectory or will enter the trajectory within a certain time period. As another example, a lane marker belonging to the vehicle's lane can be deemed relevant while road features that are farther away from the vehicle, such as a lane marker of an adjacent lane, could be deemed irrelevant. The recognition of features and the determination of whether a feature is relevant can be performed using computer vision or machine learning, as discussed earlier.

Figure 10:
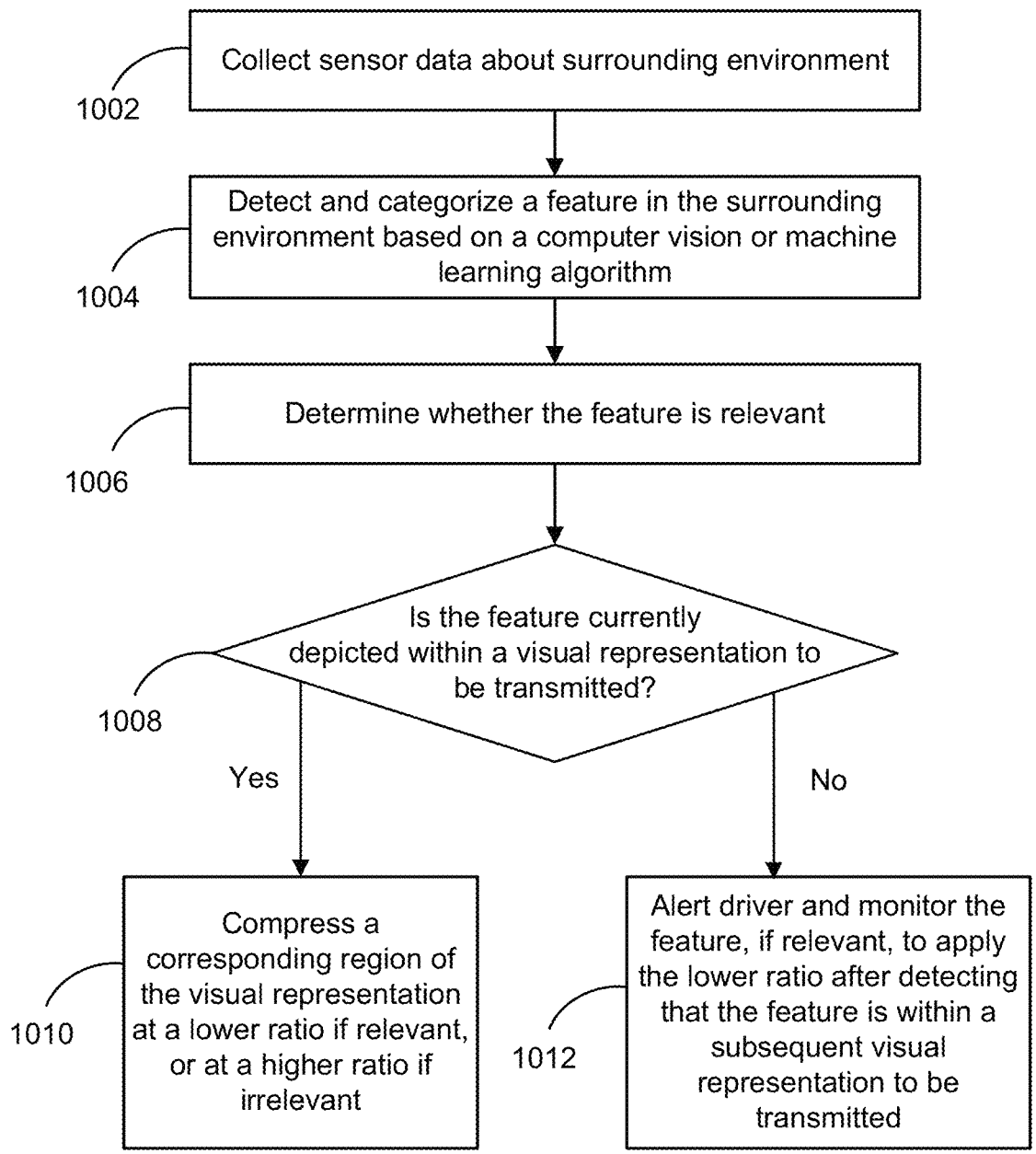
FIG. 10 is a flow chart illustrating a method for selectively compressing a visual representation based on automated feature recognition, in accordance with an example embodiment.

The determination of relevance can be performed for features that are present in the visual representation to be transmitted to the remote computer system. For example, a vehicle camera may capture an image for the visual representation, where the image includes a pedestrian. The determination of relevance can also be performed for features that are not present in the visual representation and, therefore, are not presently visible to the remote operator. For instance, the pedestrian may be detected based on data from a LIDAR or radar sensor, or a camera that is not contributing to the visual representation being transmitted. If a relevant feature is not within the visual representation, the vehicle system can track the feature and automatically apply the lower compression ratio and/or perform image augmentation once the feature becomes visible, e.g., in a subsequent image of a video stream. FIG. 10 illustrates a method that can involve such tracking.

At step 910, the vehicle system lowers a compression ratio for a region corresponding to the relevant feature. The compression ratio for the region corresponding to the relevant feature can, for example, be set lower than a default compression ratio or set to the same compression ratio as the region of interest in step 906. Alternatively or additionally, the vehicle system may augment the visual representation to bring attention to the relevant feature, for example, by drawing a bounding box around the feature or displaying an icon next to the feature. The region corresponding to the relevant feature can be defined as a box or other geometric shape around the feature. In some embodiments, the region corresponding to the relevant feature can encompass an entire display screen.

FIG. 10 is a flow chart illustrating a method 1000 for selectively compressing a visual representation based on automated feature recognition. At step 1002, the vehicle system collects sensor data about the surrounding environment around the vehicle. The collection of sensor data in step 1002 may correspond to step 702 of FIG. 7.

At step 1004, the vehicle system detects and categorizes a feature in the surrounding environment based on a computer vision or machine learning algorithm. The computer vision or machine learning algorithm can be configured to distinguish between various categories of features that a vehicle may encounter such as, for example, pedestrians, motorcycles, bicycles, cars, buses, trucks, road surfaces, crosswalks, lane markers, traffic signs, traffic lights, buildings, trees, the sky, etc.

At step 1006, the vehicle system determines whether the feature is relevant. The relevance determination can be performed using the computer vision or machine learning algorithm. In some embodiments, the relevance determination can be performed concurrently with the detection and categorization in step 1004.

At step 1008, the vehicle system determines whether the feature is currently depicted within a visual representation to be transmitted to the remote computer system. If the feature is currently depicted, then the method proceeds to step 1010. Otherwise the method proceeds to step 1012.

At step 1010, the vehicle system compresses a corresponding region of the visual representation at a lower ratio if the feature was determined to be relevant in step 1006. Otherwise, if the feature was determined to be irrelevant, the vehicle system compresses the corresponding region at a higher ratio compared to if the feature was relevant.

At step 1012, the feature is not currently depicted within the visual representation, and the vehicle system monitors the feature, provided that the feature is relevant, to apply the lower ratio discussed in connection with step 1010 after detecting that the feature is within a subsequent visual representation to be transmitted to the remote computer system. However, if the feature is irrelevant, monitoring of the feature can be omitted. Monitoring can be useful for early alerting of the remote operator to the presence of the relevant feature. The lower ratio can be applied to show the feature more clearly as soon as the feature begins to become visible. For example, if the vehicle system is monitoring another vehicle, the vehicle system does not have to wait until the other vehicle is fully visible, but can instead compress an image of the other vehicle at the lower ratio as soon as any portion of the other vehicle enters the scene of a visual representation. In some embodiments, step 1012 can also involve preemptively alerting the driver to the presence of a relevant feature, for example, through audio and/or visual output even before the feature begins to become visible.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Having described several embodiments, various modifications, alternative constructions, and equivalents may be used without departing from the spirit of the disclosure. For example, the above elements may merely be a component of a larger system, wherein other rules may take precedence over or otherwise modify the application of the embodiments. Also, a number of steps may be undertaken before, during, or after the above elements are considered. Accordingly, the above description does not limit the scope of the disclosure to the exact embodiments described.

What is claimed is:

1. A method for compressing image data for display to a remote operator of a vehicle, comprising:

receiving, by a first computer system located on the vehicle, information from a second computer system remotely located from the vehicle, the information indicating a direction or area of focus of the remote operator;

generating, by the first computer system, a visual representation of a surrounding environment around the vehicle based on at least one image captured by one or more cameras on the vehicle;

identifying, by the first computer system, a first region in the visual representation as being a region of interest based on the information from the second computer system;

identifying, by the first computer system, a second region in the visual representation as being a region of interest based on the information from the second computer system or based on sensor data from one or more sensors of the vehicle;

compressing, by the first computer system, the visual representation, wherein the first region and the second region are compressed to a lesser extent than a third region located outside the first region and the second region, and wherein the compressing comprises using different compression ratios to compress the first region and the second region, and using a compression ratio higher than the different compression ratios to compress the third region; and transmitting, by the first computer system, the compressed visual representation to the second computer system, wherein the compressed visual representation is decompressed for display on one or more display devices viewed by the remote operator.

2. The method of claim 1, wherein the information from the second computer system indicates a direction in which the remote operator is gazing or facing and is generated based on data captured by a sensor of the second computer system, the method further comprising:

determining, based on changes in the direction over time, that an amount of time that the remote operator spends looking at a direction corresponding to the first region is greater than an amount of time that the remote operator spends looking at a direction corresponding to the second region; and responsive to determining that the amount of time that the remote operator spends looking at the direction corresponding to the first region is greater, setting a compression ratio of the first region lower than a compression ratio of the second region.

3. The method of claim 1, wherein the visual representation comprises a single image formed by stitching together images captured by multiple cameras on the vehicle.

4. The method of claim 1, wherein the decompressed visual representation is displayed on a plurality of display devices, each display device displaying a different portion of the decompressed visual representation, and wherein the first region corresponds to a portion covering an entire display screen of one of the plurality of display devices.

5. The method of claim 1, further comprising:
monitoring, by the first computer system, a quality of a wireless connection through which the visual representation is to be transmitted to the second computer system, the quality of the wireless connection being indicative of a speed with which data can be transmitted between the first computer system and the second computer system; and
determining, based on the monitoring, that the quality of the wireless connection has fallen below a threshold, wherein the compressing of the first region and the second region to a lesser extent than the third region is based on the determining that the quality of the wireless connection has fallen below the threshold.

6. The method of claim 1, wherein identifying the second region as being a region of interest comprises:
determining, by the first computer system, a trajectory of the vehicle; and
identifying the second region as being a region of interest based on determining that the second region corresponds to an area around the trajectory.

7. The method of claim 6, wherein the trajectory is determined based on at least one of the sensor data from the one or more sensors of the vehicle or driving input from the remote operator, the sensor data or the driving input being indicative of a speed and an orientation of the vehicle.

8. The method of claim 1, wherein identifying the second region as being a region of interest comprises:
detecting, by the first computer system, a feature in the surrounding environment based on the sensor data from the one or more sensors of the vehicle, the sensor data comprising image data, non-image data, or a combination thereof; and
identifying the second region as being a region of interest based on the second region corresponding to an area that includes the detected feature.

9. The method of claim 8, wherein the sensor data is from a non-imaging sensor or a camera not contributing to the visual representation.

10. The method of claim 1, further comprising:
receiving, by the first computer system, a driving instruction from the second computer system, the driving instruction being based on input supplied by the remote operator in response to viewing the decompressed visual representation; and
maneuvering, by the first computer system, the vehicle according to the driving instruction.

11. A vehicle system for compressing image data for display to a remote operator of a vehicle, comprising:
one or more sensors, the one or more sensors including one or more cameras configured to capture images of a surrounding environment around the vehicle; and
one or more processors configured to:
receive information from a remote computer system, the information indicating a direction or area of focus of the remote operator;
generate a visual representation of the surrounding environment based on at least one image captured by the one or more cameras;
identify a first region in the visual representation as being a region of interest based on the information from the remote computer system;
identify a second region in the visual representation as being a region of interest based on the information from the remote computer system or based on sensor data from the one or more sensors;
compress the visual representation, wherein the first region and the second region are compressed to a lesser extent than a third region located outside the first region and the second region, and wherein to compress the visual representation, the one or more processors are configured to use different compression ratios to compress the first region and the second region, and to use a compression ratio higher than the different compression ratios to compress the third region; and
transmit the compressed visual representation to the remote computer system, wherein the compressed visual representation is decompressed for display on one or more display devices viewed by the remote operator.

12. The vehicle system of claim 11, wherein the information from the remote computer system indicates a direction in which the remote operator is gazing or facing is generated based on data captured by a sensor of the remote computer system, and wherein the one or more processors are further configured to:
determine, based on changes in the direction over time, that an amount of time that the remote operator spends looking at a direction corresponding to the first region is greater than an amount of time that the remote operator spends looking at a direction corresponding to the second region; and
responsive to determining that the amount of time that the remote operator spends looking at the direction corresponding to the first region is greater, set a compression ratio of the first region lower than a compression ratio of the second region.

13. The vehicle system of claim 11, wherein the one or more processors are configured to generate the visual representation by stitching together images captured by multiple cameras on the vehicle to form a single image.

14. The vehicle system of claim 11, wherein the decompressed visual representation is displayed on a plurality of display devices, each display device displaying a different portion of the decompressed visual representation, and wherein the first region corresponds to a portion covering an entire display screen of one of the plurality of display devices.

15. The vehicle system of claim 11, wherein the one or more processors are further configured to:
monitor a quality of a wireless connection through which the visual representation is to be transmitted to the remote computer system, the quality of the wireless connection being indicative of a speed with which data can be transmitted between the vehicle system and the remote computer system; and
determine, based on the monitoring, that the quality of the wireless connection has fallen below a threshold, wherein the compressing of the first region and the second region to a lesser extent than the third region is based on the determining that the quality of the wireless connection has fallen below the threshold.

16. The vehicle system of claim 11, wherein to identify the second region as being a region of interest, the one or more processors are configured to:
   detect a feature in the surrounding environment based on the sensor data from the one or more sensors, the sensor data comprising image data, non-image data, or a combination thereof; and
   identify the second region as being a region of interest based on the second region corresponding to an area that includes the detected feature.

17. The vehicle system of claim 16, wherein the sensor data is from a non-imaging sensor or a camera not contributing to the visual representation.

18. The vehicle system of 11, wherein to identify the second region as being a region of interest, the one or more processors are configured to:
   determine a trajectory of the vehicle; and
   identify the second region as being a region of interest based on determining that the second region corresponds to an area around the trajectory.

19. The vehicle system of claim 18, wherein the trajectory is determined based on at least one of the sensor data from the one or more sensors or driving input from the remote operator, the sensor data or the driving input being indicative of a speed and an orientation of the vehicle.

20. A non-transitory computer-readable storage medium containing instructions that, when executed by one or more processors of a computer system in a vehicle, cause the one or more processors to:
   receive information from a second computer system remotely located from the vehicle, the information indicating a direction or area of focus of a remote operator;
   generate a visual representation of a surrounding environment around the vehicle based on at least one image captured by one or more cameras on the vehicle;
   identify a first region in the visual representation as being a region of interest based on the information from the second computer system;
   identify a second region in the visual representation as being a region of interest based on the information from the second computer system or based on sensor data from one or more sensors of the vehicle;
   compress the visual representation, wherein the first region and the second region are compressed to a lesser extent than a third region located outside the first region and the second region, and wherein to compress the visual representation, the instructions cause the one or more processors to use different compression ratios to compress the first region and the second region, and to use a compression ratio higher than the different compression ratios to compress the third region;
   transmit the compressed visual representation to the second computer system, wherein the compressed visual representation is decompressed for display on one or more display devices viewed by the remote operator;
   receive a driving instruction from the second computer system, the driving instruction being based on input supplied by the remote operator in response to viewing the decompressed visual representation; and
   maneuver the vehicle according to the driving instruction.

* * * * *